(12) United States Patent
Kuwabara et al.

(10) Patent No.: US 8,400,469 B2
(45) Date of Patent: Mar. 19, 2013

(54) COORDINATED OPERATION METHOD AND COMMUNICATION TERMINAL DEVICE

(75) Inventors: Masahiko Kuwabara, Tokyo (JP); Kazuo Aoki, Tokyo (JP); Toshiro Matsumura, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 613 days.

(21) Appl. No.: 11/826,838

(22) Filed: Jul. 18, 2007

(65) Prior Publication Data

US 2008/0020804 A1 Jan. 24, 2008

Related U.S. Application Data

(63) Continuation of application No. PCT/JP2006/301046, filed on Jan. 24, 2006.

(30) Foreign Application Priority Data

Jan. 25, 2005 (JP) .................................. 2005-017245

(51) Int. Cl.
*G09G 5/00* (2006.01)
*G06F 3/048* (2006.01)
*G06F 3/033* (2006.01)

(52) U.S. Cl. ........ 345/629; 345/660; 345/670; 715/790; 715/800; 715/864

(58) Field of Classification Search .................. 345/629, 345/660, 670, 173; 715/864, 781, 790, 794, 715/800; 455/466, 567
See application file for complete search history.

(56) References Cited

U.S. PATENT DOCUMENTS

| 6,434,224 | B1 | 8/2002 | Nagashima et al. | |
| 2002/0037753 | A1 | 3/2002 | Shitahaku | |
| 2003/0100347 | A1* | 5/2003 | Okada et al. | 455/567 |
| 2003/0132970 | A1 | 7/2003 | Lehmeier et al. | 345/789 |
| 2004/0100511 | A1* | 5/2004 | Wong et al. | 345/866 |
| 2005/0031127 | A1* | 2/2005 | Gosior et al. | 381/2 |
| 2005/0099400 | A1* | 5/2005 | Lee | 345/173 |
| 2006/0197753 | A1* | 9/2006 | Hotelling | 345/173 |
| 2007/0225022 | A1* | 9/2007 | Satake | 455/466 |
| 2008/0055256 | A1* | 3/2008 | Kwong et al. | 345/173 |

FOREIGN PATENT DOCUMENTS

| CA | 2 260 392 A1 | 7/1999 |
| EP | 0 349 458 | 5/1989 |

(Continued)

OTHER PUBLICATIONS

"Focus Ratio for Windows" IBM Technical Disclosure Bulletin, IBM Corp. New York, US, vol. 35, No. 4B, Sep. 1, 1992, pp. 62-63.

(Continued)

*Primary Examiner* — Chante Harrison
(74) *Attorney, Agent, or Firm* — Kratz, Quintos & Hanson, LLP

(57) ABSTRACT

During execution of an engine application by an engine unit, a host unit determines a region for host display upon a display screen, wherein the host unit determines the display contents, according to the usage direction of the display screen employed. Subsequently, the unit creates a host image; the unit generates an engine application image, when the operation of the engine application starts. A display image generation means then generates an image during engine application execution wherein the host image and the engine application image are overlapped, so that, in the region wherein the region for host display and the region for engine display are superimposed, priority is given to the engine application image. Thus, along with it being possible to build the device as a whole in a more compact manner, it is also possible to ensure the convenience from the point of view of the user.

9 Claims, 12 Drawing Sheets

FOREIGN PATENT DOCUMENTS

| | | |
|---|---|---|
| EP | 0 439 087 | 1/1991 |
| GB | 2 369 969 A | 6/2002 |
| JP | 11-284771 | 10/1999 |
| JP | 2002-77329 | 3/2002 |
| JP | 2002-111805 | 4/2002 |
| KR | 2003-0056054 | 7/2003 |
| WO | 99/24966 | 5/1999 |
| WO | 02/075517 | 9/2002 |
| WO | 02/093879 | 11/2002 |

OTHER PUBLICATIONS

Supplementary European Search Report issued for counterpart European Patent Application No. 06712262 dated May 7, 2009.

European Examiner Report issued for counterpart European Patent Application No. 0671226.2 dated Mar. 3, 2012.

English translation of Korean Notice of Submission of Opinion issued for counterpart Korean Patent Application No. 10-2007-7017178 dated Mar. 26, 2012.

* cited by examiner

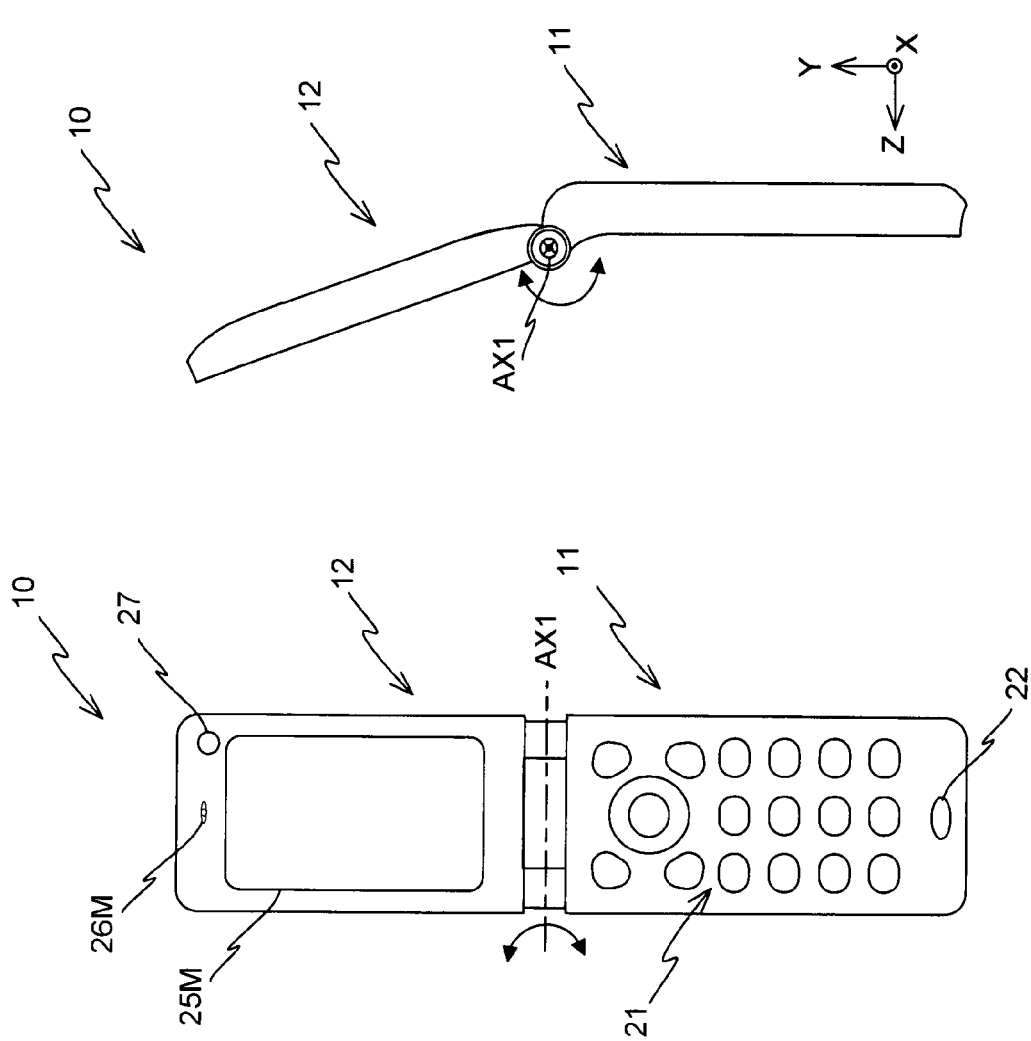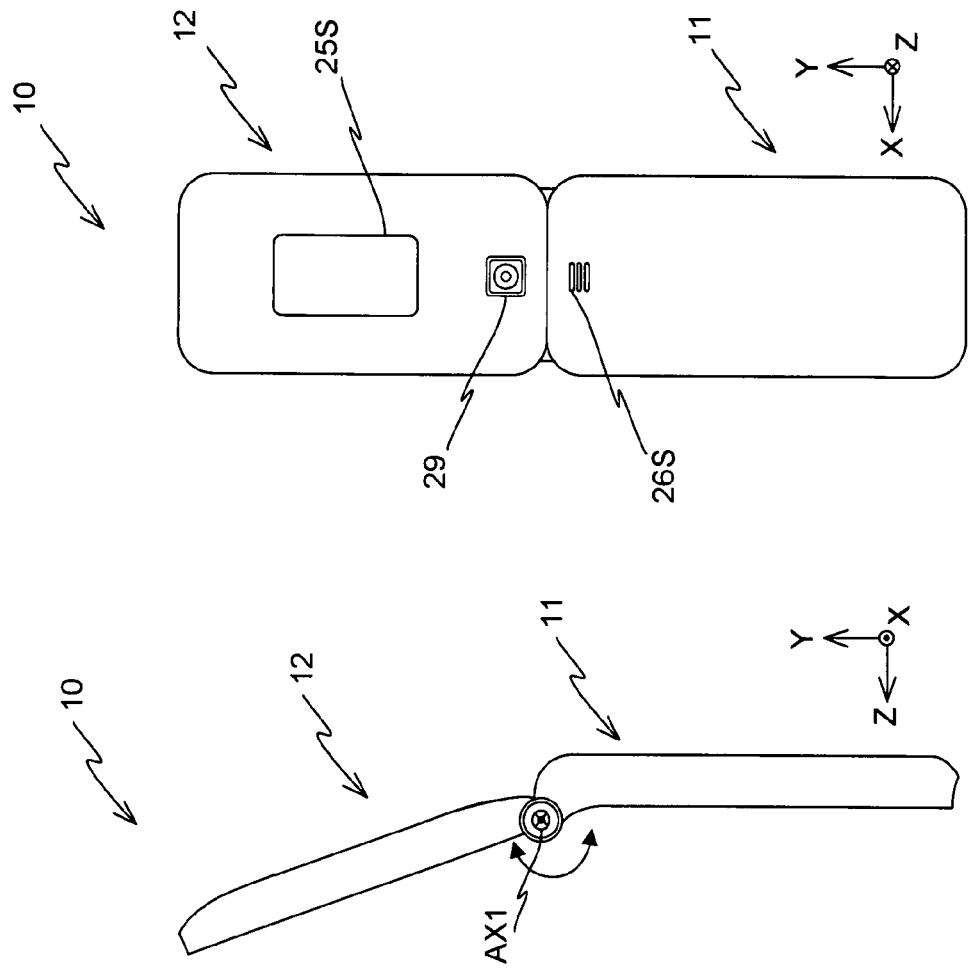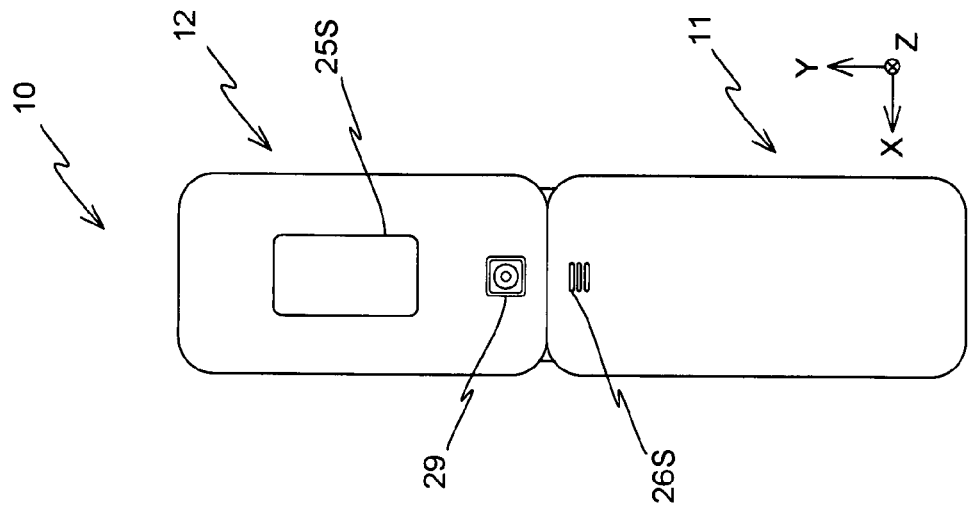

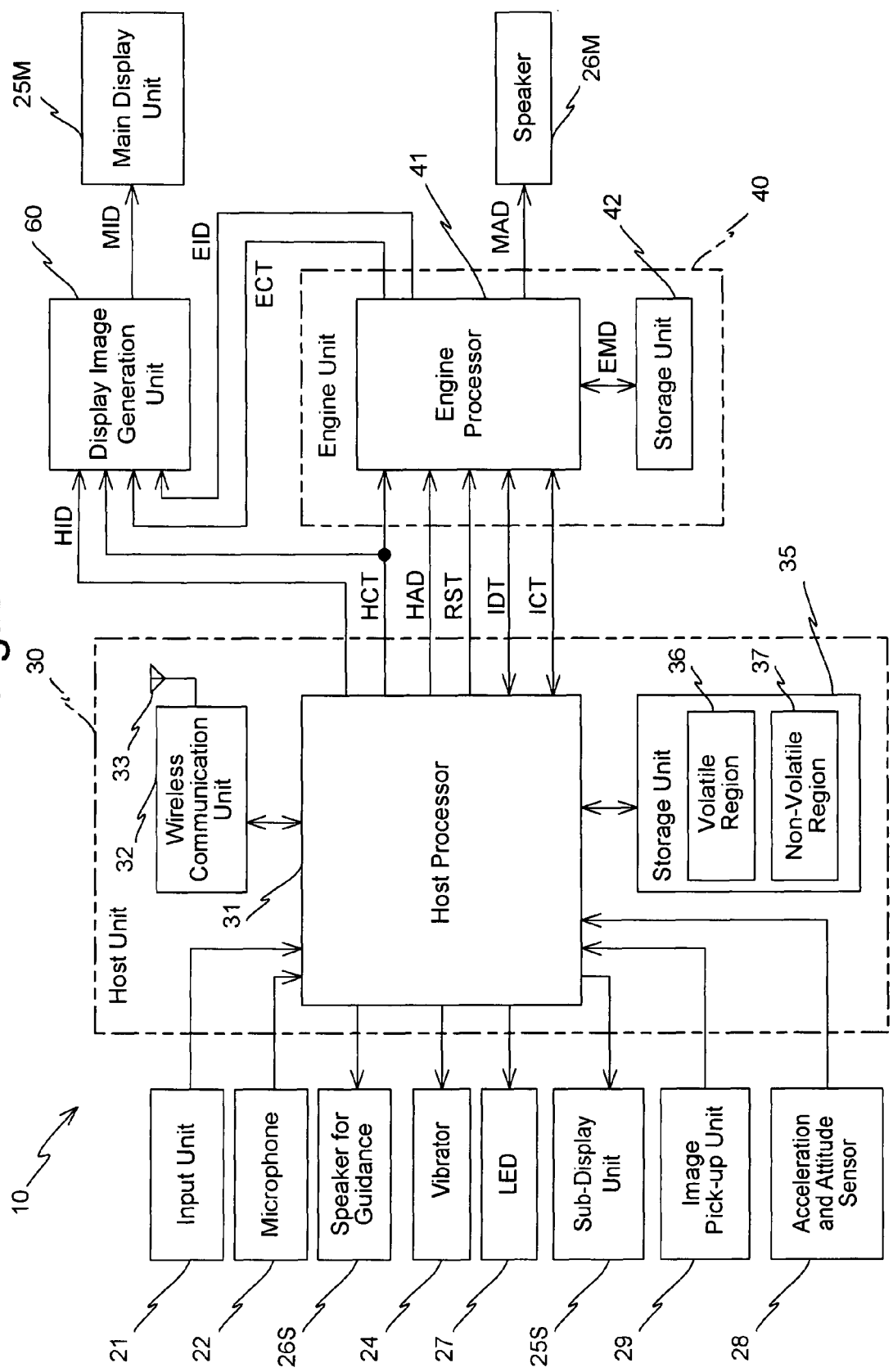

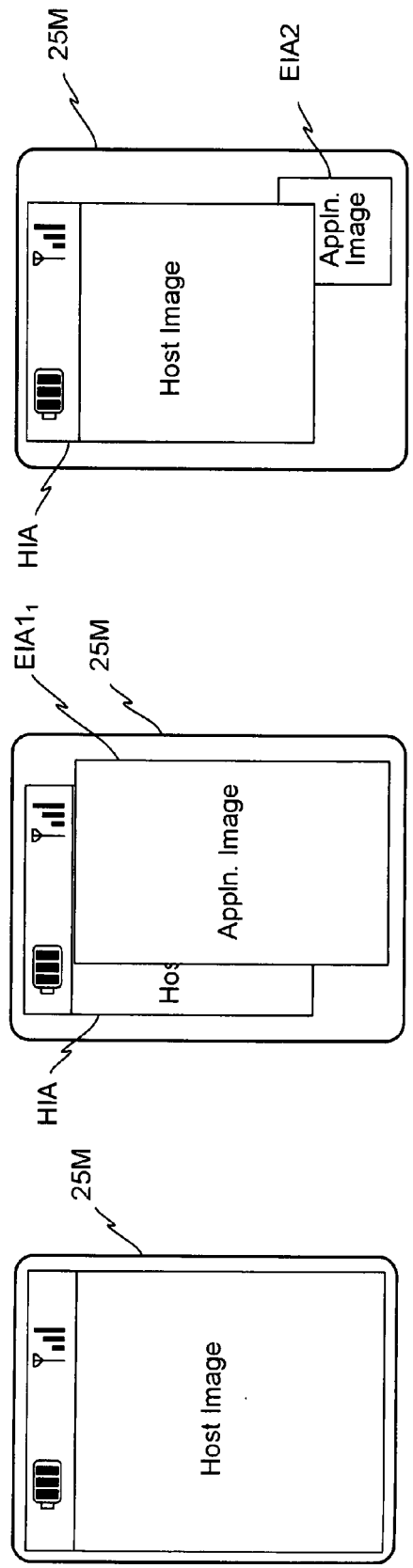

COORDINATED OPERATION METHOD AND COMMUNICATION TERMINAL DEVICE

RELATED APPLICATION

This is a continuation application of the international patent application No. PCT/JP2006/301046 filed with Application date: Jan. 24, 2006. The present application is based on, and claims priority from, J.P. Application 2005-017245, filed on Jan. 25, 2005, the disclosure of which is hereby incorporated by reference herein its entirety.

BACKGROUND OF THE INVENTION

The present invention relates to a coordinated operation method and to a communication terminal device, and in more detail relates to a coordinated operation method in which a host unit, which performs processing associated with communication with the exterior, and an engine unit, which executes an engine application under the management of the host unit, operate in a coordinated manner in a communication terminal device, and to a communication terminal device which employs this coordinated operation method.

BACKGROUND ART

From the past, as communication terminal devices, mobile communication terminal devices such as cellular phones and the like have become widespread. The progression of technology related to such mobile communication terminal devices, and in particular related to cellular phones, is remarkable, and, in addition to the function of communication via a mobile communication network, which is the essential function of such a device as a mobile communication terminal device, additional functionality for appreciating games or music is also coming to be implemented.

In such a mobile communication terminal device, a processor is incorporated which performs various types of data processing in order to fulfill the above described essential function and additional functionality. To this processor, there are connected resources such as a storage unit including a storage element for storing various programs and data, a wireless communication unit for performing wireless communication, an input unit for the user to issue input commands, a notification unit (a display unit or an audio output unit) for notifying various kinds of information to the user, and so on.

And it is arranged to fulfill the above described essential function and additional functionality by the processor executing a program which is stored in the storage unit, and, according to requirements, performing appropriate control of the connected resources. For example, to focus attention upon the screen of the display unit: when fulfilling the essential function, a program within the main processing unit which is a program group for managing the resources of the device along with fulfilling the essential function is executed, and a screen for the program is displayed upon the display unit. On the other hand, when fulfilling the additional functionality, principally an application program for performing the additional functionality is executed, and a screen for the application program is displayed upon the display unit.

SUMMARY OF THE INVENTION

As described above, with a prior art type mobile communication terminal device, a general purpose type processor has been employed as the incorporated processor, since it is necessary to fulfill various kinds of functions. This leads to a simple structure for a device, and a method that is excellent from the viewpoint of miniaturization and reduced power consumption of the device. However, with the use of a general purpose type processor, even if an attempt is made to enhance the performance for additional functionality operations in order, for example, to enjoy the appreciation of games or music, it is difficult to contemplate any dramatic performance enhancement.

Now, when a comparison is drawn with other information processing devices, the reason that demands are being made for enhancement of the performance of mobile communication terminal devices may be the to be due to the provision of additional functionality operations. While such additional functionality operations for which performance enhancement is demanded in this manner are, in concrete terms, the execution of games or reproduction of music or the like, during these additional functionality operations, in particular, it is considered that screen display processing and audio data output processing impose a heavy load upon the processor.

Furthermore, although it is a requirement upon a mobile communication terminal device to fulfill both the above described essential function and the above described additional functionality, nevertheless, since in principle the user is a single individual, in no circumstances does a requirement arise for the essential functionality operation and the additional functionality operation to operate independently and simultaneously. For example, while performing telephone conversation operation which is an essential functionality operation, no requirement ever arises to perform game operation which is an additional functionality operation.

Due to the above reasons, it has been considered to additionally provide an engine processor which is dedicated to the additional functionality and which is superb at screen display processing and audio data output processing, and to execute applications related to the additional functionality upon an engine unit which incorporates this engine processor, based upon management by a host unit incorporating a host processor which is a processor for performing communication operation. When employing this type of structure which incorporates both a host unit and an engine unit, and while making the device as a whole compact, it is considered to be essential for both of these units to operate in a coordinated manner.

With regard to this type of coordinated operation, even when an application for implementing additional functionality is being executed by the engine processor, the program for management of resources by the host processor is still operating. Due to this, it may be desired to provide a dedicated display means for each of these programs which are operating upon these two processors. However, a structure in which two display means are provided is an outstandingly redundant structure, and this constitutes a reason for the building of the device as a whole in a compact manner to be impeded.

The present invention has been conceived in consideration of the circumstances described above, and it takes it as its object to provide a coordinated operation method with which, in a structure which includes a host unit which includes a host processor and which performs processing associated with communication with the exterior, and an engine unit which includes an engine processor and which executes a predetermined function under the management of this host unit, it is possible to build the device as a whole in a compact manner, while ensuring convenience from the point of view of the user.

Furthermore, the present invention takes it as its object to provide a communication terminal device with which, while including a host unit which performs processing associated with communication with the exterior and an engine unit which executes a predetermined function under the management of this host unit, along with it being possible to build the device as a whole in a compact manner, also the convenience from the point of view of the user can be ensured.

The coordinated operation method of the present invention is a coordinated operation method in which a host unit which performs processing associated with communication with the exterior, and an engine unit which executes an engine application under the management of the host unit, operate in a coordinated manner in a communication terminal device, comprising: a region for host display definition step in which the host unit determines upon a region for host display upon a display screen during execution of the engine application by the engine unit, in which the display contents are determined by the host unit, according to the direction of usage of the display screen which is employed during execution of the engine application by the engine unit; a host image generation step in which the host unit generates a host image, which is image data to be displayed in the region for host display; an engine application image generation step in which, according to the progression of execution of the engine application, the engine unit generates an engine application image to be displayed in a region for engine display upon the display screen, which is determined corresponding to the engine application; an image during engine application execution generation step in which, during execution of the engine application, an image during engine application execution is generated in which the host image and the engine application image are overlapped so that, in the region in which the region for host display and the region for engine display are superimposed, priority is given to the engine application image; and an image during engine application execution display step in which the image during engine application execution is displayed upon the display screen. Here by "image during engine application execution" is meant an image made by combining the host image and the engine application image during execution of the engine application, which is displayed in a region which is the logical sum, during execution of the engine application, of the region for host display and the region for engine display. In this specification, it will be supposed that the technical term "image during engine application execution" is used with this meaning.

With this coordinated operation method, during the execution of the engine application by the engine unit, in the region for host display definition step, the host unit determines upon the region for host display upon the display screen during execution of the engine application by the engine unit, in which the display contents are determined by the host unit, according to the direction of usage of the display screen which is employed during execution of the engine application by the engine unit. In other words, the host display region is determined by the host unit in a display direction for which if, during execution of the engine application, display in parallel with the engine application image or change over display is performed, then there will be no sense of discomfort from the point of view of the user (for example, in the same display direction as the display direction of the engine application image).

Next, in the host image generation step, the host unit generates the host image, which is image data to be displayed in the region for host display. Moreover, when the operation of the engine application starts, in the engine application image generation step, according to the progression of execution of the engine application, the engine unit generates an engine application image to be displayed in the region for engine display upon the display screen, which is determined corresponding to the engine application.

In this manner, when the host image and the engine application image are generated during execution of the engine application, in the image during engine application execution generation step, the image during engine application execution is generated, in which the host image and the engine application image are overlapped so that, in the region in which the region for host display and the region for engine display are superimposed, priority is given to the engine application image. In the image during engine application execution display step, this image during engine application execution is displayed upon the display screen.

As a result, while using a single display screen, during execution of the engine application, along with preferentially displaying the engine application image, the host image is also displayed in a region which will not distort the engine application image. Due to this, by adjusting the relationship between the region for host display and the region for engine display, it becomes possible, while ensuring a perfect display for the engine application image, also to display that portion of the host image which it is desired to display even while the engine application is being executed, in parallel with the engine application image, and in a manner in which it can easily be seen by the user.

Accordingly, by employing the coordinated operation method of the present invention, it is possible to build a communication terminal device in a compact manner, while ensuring the convenience from the point of view of the user.

With this coordinated operation method of the present invention, there may be further included: an image during engine application pausing generation step in which, during pausing of the engine application, an image during engine application pausing is generated by overlapping the host image and the engine application image at the time point that the engine application has been paused, so that, in the region in which the region for host display and the region for engine display are superimposed, priority is given to the host image; and an image during engine application pausing display step in which the image during engine application pausing is displayed upon the display screen. Here, by "image during engine application pausing" is meant an image which is displayed, during pausing of the engine application, in the region which is the logical sum of the region for host display and the region for engine display, and which is made by combining the host image and the engine application image at the time point that the engine application was paused. In this description, the technical term "image during engine application pausing" will be used with this meaning.

In this case, while the engine application is paused, in the image during engine application pausing generation step, the image during engine application pausing is generated by overlapping the host image and the engine application image at the time point that the engine application was paused, so that, in the region where the region for host display and the region for engine display are superimposed, priority is given to the host image. This image during engine application pausing is then displayed upon the display screen. As a result, while using a single display screen, during pausing of the engine application, along with preferentially displaying the host image, the engine application image is also displayed in a region which will not distort the host image.

Here it is possible further to include an engine display region shrinkage step in which the region for engine display is shrunk when the engine application is paused. In this case, by adjusting the relationship between the region for host display and the region for engine display so that at least a portion of the engine display region when shrunk down does not overlap the region for host display, it becomes possible, while ensuring a perfect display for the host image engine application image, also to display at least a portion of the image during engine application pausing, even while the engine application is paused, in parallel with the host image. Due to this, by equally shrinking down the engine application image in cooperation with the shrinking of the engine display region, it is possible to maintain the ambience which the user has built up by the execution of the engine application, even in the state in which the engine application is paused.

Furthermore, with the coordinated operation method of the present invention, it is possible further to comprise: an image during engine application pausing generation step in which, during pausing of the engine application, along with setting the entire area of the display screen as the region for host display, also an image during engine application pausing is generated consisting only of the host image; and an image during engine application pausing display step in which the image during engine application pausing is displayed upon the display screen. In this case, during pausing of the engine application, in the image during engine application pausing generation step, along with setting the entire area of the display screen as the region for host display, also an image during engine application pausing is generated consisting only of the host image. During the image during engine application pausing display step, this image during engine application pausing is displayed upon the display screen. Accordingly, during pausing of the engine application, the host image is clearly displayed upon the display screen.

With the coordinated operation method of the present invention, it is possible further to comprise an engine display region shrinkage step in which the region for engine display is shrunk when the engine application is paused; an image during engine application pausing generation step in which, during pausing of the engine application, an image during engine application pausing is generated by overlapping the host image and the engine application image at the time point that the engine application has been paused, so that, in the region in which the region for host display and the region for engine display are superimposed, priority is given to the engine application image; and an image during engine application pausing display step in which the image during engine application pausing is displayed upon the display screen.

In this case, when the engine application is paused, in the engine display region shrinkage step, the region for engine display is shrunk down. During pausing of the engine application, in the image during engine application pausing generation step, an image during engine application pausing is generated by overlapping the host image and the engine application image at the time point that the engine application has been paused, so that, in the region in which the region for host display and the region for engine display are superimposed, priority is given to the engine application image. In the image during engine application pausing display step, this image during engine application pausing is then displayed upon the display screen.

As a result, by adjusting the relationship between the region for host display and the region for engine display and the shrinkage ratio of the engine display region, while ensuring a sufficient display region for providing the host image, the engine application image is displayed upon the display screen in parallel therewith, during pausing of the engine application. Due to this, by equally shrinking down the engine application image in cooperation with the shrinking of the engine display region, it is possible to maintain the ambience which the user has built up by the execution of the engine application, even in the state in which the engine application is paused.

The communication terminal device of the present invention is a communication terminal device, comprising: a host unit, comprising a host processor, which performs processing associated with communication with the exterior; an engine unit, comprising an engine processor, which executes an engine application under the management of the host unit; a display unit comprising a display screen which displays an image; and a display image generation unit which, under control by the host unit, generates a display image for display upon the display screen, based upon information for a host image from the host unit and information for an engine application image from the engine unit; and characterized in that: the host unit, during the execution of the engine application by the engine unit, along with determining a region for host display upon the display screen according to the direction of usage of the display screen which is employed during the execution of the engine application by the engine unit, also generates a host image, which is image data to be displayed in the region for host display; the engine unit, according to the progress of execution of the engine application, generates an engine application image to be displayed in a region for engine display upon the display screen, which the engine unit determines in correspondence to the engine application; and the display image generation unit, during the execution of the engine application, according to a command from the host unit, generates an image during engine application execution in which the host image and the engine application image are overlapped so that, in the region in which the region for host display and the region for engine display are superimposed, priority is given to the engine application image.

With this communication terminal device, during the execution of the engine application by the engine unit, the host unit determines the region for host display upon the display screen according to the direction of usage of the display screen which is employed during the execution of the engine application by the engine unit. Next, the host unit generates the host image, which is image data to be displayed in this region for host display. Furthermore, when the engine application starts, according to the progress of execution of the engine application, the engine unit generates an engine application image to be displayed in a region for engine display upon the display screen, which the engine unit determines in correspondence to the engine application.

In this manner, when the host image and the engine application image are generated during the execution of the engine application, the display image generation unit generates an image during engine application execution in which the host image and the engine application image are overlapped so that, in the region in which the region for host display and the region for engine display are superimposed, priority is given to the engine application image. This image during engine application execution is then displayed upon the display screen of the display unit.

In other words, with the communication terminal device of the present invention, it is possible to perform display upon the display unit by using the coordinated operation method of the present invention as described above. Accordingly, with the communication terminal device of the present invention, along with it being possible to build the device as a whole in a compact manner, it is also possible to ensure the convenience of use from the point of view of the user.

With the communication terminal device of the present invention, the display image generation unit may have a structure such that, during pausing of the engine application, according to a command from the host unit, it generates an image during engine application pausing by overlapping the host image and the engine application image at the time point that the engine application has been paused, so that, in the region in which the region for host display and the region for engine display are superimposed, priority is given to the host image.

In this case, during pausing of the engine application, the display image generation unit generates the image during engine application pausing by overlapping the host image and the engine application image at the time point that the engine application has been paused, so that, in the region in which the region for host display and the region for engine display are superimposed, priority is given to the host image. This image during engine application pausing is then displayed upon the display screen. As a result, while using a single display screen, during pausing of the engine application, along with preferentially displaying the host image, the engine application image is also displayed in a region which will not interfere with the host image.

In this point, the display image generation unit may have a structure such that it shrinks down the region for engine display, when the engine application is paused, according to a command from the host unit. In this case, by adjusting the relationship between the region for host display and the region for engine display so that at least a portion of the engine display region when shrunk down does not overlap the region for host display, it becomes possible, while ensuring a perfect display for the host image, also to display at least a portion of the image during engine application pausing, even while the engine application is paused, in parallel with the host image. Due to this, by the display image generation unit equally shrinking down the engine application image in cooperation with the shrinking of the engine display region, it is possible to maintain the ambience which the user has built up by the execution of the engine application, even in the state in which the engine application is paused.

Furthermore, with the communication terminal device of the present invention, the display image generation unit may have a structure such that, during pausing of the engine application, according to a command from the host unit, along with setting the entire area of the display screen as the region for host display, it also generates an image during engine application pausing consisting only of the host image. In this case, during pausing of the engine application, the display image generation unit, along with using the entire area of the display screen as the region for host display, also generates an image during engine application pausing which consists only of the host image. This image during engine application pausing is then displayed upon the display screen. Accordingly, the host image is displayed clearly upon the display screen during pausing of the engine application.

Moreover, with the communication terminal device of the present invention, the display image generation unit may have a structure such that, during pausing of the engine application, according to a command from the host unit, along with shrinking down the region for engine display, it also generates an image during engine application pausing by overlapping the host image and the engine application image at the time point that the engine application has been paused, so that, in the region in which the region for host display and the region for engine display are superimposed, priority is given to the engine application image.

In this case, when the engine application is paused, the display image generation unit shrinks down the region for engine display according to a command from the host unit. During pausing of the engine application, the display image generation unit then generates an image during engine application pausing by overlapping the host image and the engine application image at the time point that the engine application has been paused, so that, in the region in which the region for host display and the region for engine display are superimposed, priority is given to the engine application image.

As a result, by adjusting the relationship between the region for host display and the region for engine display and the shrinkage ratio of the engine display region, while ensuring a sufficient display region for providing the host image, the engine application image is displayed upon the display screen in parallel therewith, during pausing of the engine application. Due to this, by equally shrinking down the engine application image in cooperation with the shrinking of the engine display region, it is possible to maintain the ambience which the user has built up by the execution of the engine application, even in the state in which the engine application is paused.

Yet further, with the communication terminal device of the present invention, the host unit may further include a wireless communication unit, connected to the host processor, for performing wireless communication with a base station of a mobile communication network. In this case, it is possible to make the communication terminal device of the present invention serve as a mobile communication terminal such as a cellular phone or the like.

As has been explained above, according to the coordinated operation method of the present invention, the advantageous effect is obtained that, in a structure which includes a host unit, comprising a host processor, which performs processing associated with communication with the exterior, and an engine unit, comprising an engine processor, which executes a predetermined function under the management of the host unit, while ensuring the convenience from the point of view of the user, it is also possible to build the device as a whole in a more compact manner.

Furthermore, according to the communication terminal device of the present invention, the advantageous effect is obtained that, while including a host unit which performs processing associated with communication with the exterior, and an engine unit which executes a predetermined function under the management of the host unit, and moreover along with being able to build the device as a whole in a more compact manner, it is also possible to ensure the convenience from the point of view of the user.

BRIEF DESCRIPTION OF DRAWINGS

FIG. 1A is an elevation view showing the external appearance of a cellular phone according to an embodiment of the present invention in the opened up state;

FIG. 1B is a right side view showing the external appearance of this cellular phone according to an embodiment of the present invention in the opened up state;

FIG. 1C is a rear surface view showing the external appearance of this cellular phone according to an embodiment of the present invention in the opened up state;

FIG. 2 is a block diagram for explanation of the functional structure of the cellular phone shown in FIGS. 1A through 1C;

FIG. 7A is a figure showing an example of screen display while this engine application upon the cellular phone of FIGS. 1A through 1C is stopped;

FIG. 7B is a figure showing an example of screen display while this engine application upon the cellular phone of FIGS. 1A through 1C is being executed;

FIG. 7C is a figure showing an example of screen display while this engine application upon the cellular phone of FIGS. 1A through 1C is paused;

DETAILED DESCRIPTION

Figure 3:
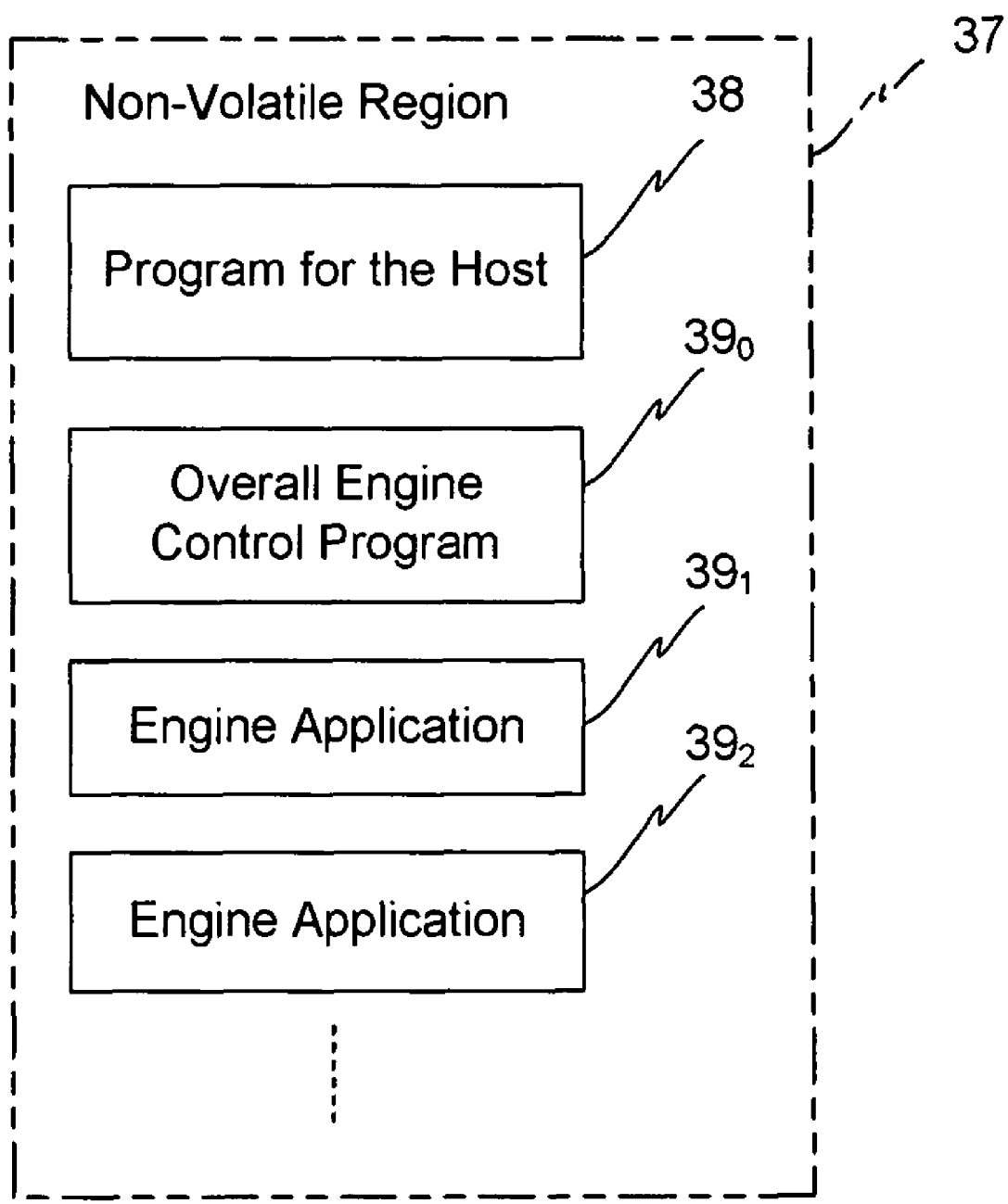
FIG. 3 is a figure for explanation of the contents of a non-volatile region in a storage unit of a host unit of FIG. 2.

In the following, an embodiment of the present invention will be explained with reference to FIGS. 1A through 7C. It should be understood that, in these drawings, the same reference symbols are appended to elements which are the same or equivalent, and duplicated explanation will be omitted.

In FIGS. 1A through 2, the structure of a cellular phone 10 which is a communication terminal device according to an embodiment of the present invention is schematically shown. This cellular phone 10 is a cellular phone of a so called clamshell type which can be folded up. Here, in FIG. 1A there is shown an elevation view of the external appearance of the cellular phone 10 in its opened up state; in FIG. 1B there is shown a right side view of the external appearance of this cellular phone 10 in its opened up state; and in FIG. 1C there is shown a rear surface view of the external appearance of this cellular phone 10 in its opened up state. Moreover, in FIG. 2 there is shown a functional block diagram of the cellular phone 10.

As shown in FIGS. 1A through 1C, this cellular phone 10 comprises a first portion 11 and a second portion 12 which, relative to this first portion 11, is rotatable around a shaft AX1 as an axis.

As shown in FIG. 1A, upon the first portion 11, there are disposed (a) an input unit 21 upon which there are arranged input keys such as a numeral key pad, function keys, and the like, and (b) a microphone 22 for inputting voice during a telephone conversation. Furthermore, as shown in . 1C, on the rear surface side of the first portion 11 when its surface upon which the input unit 21 is disposed is faced to the front, there is disposed (c) a speaker for guidance 26S, for emitting ring tones and guidance audio.

As shown in FIG. 1A, on the second portion 12, there are disposed: (d) a main display unit 25M which displays input guidance, operational states, received messages, results of image capture by an image pick-up unit 29 which will be described hereinafter, images created by an engine application, and the like; (e) a speaker 26M which reproduces audio signals which have been set from an opposite party to communication during a telephone conversation; and (f) a LED (Light Emitting Diode) 27 for attracting the attention of the user. Furthermore, as shown in FIG. 1C, on the rear surface side of the second portion 12 when its display surface upon which the main display unit 25M is disposed is faced to the front, there are disposed (g) a sub-display unit 25S which performs auxiliary display, and (h) an image pick-up unit 29 which captures the image which is within the field of view of an imaging optical system.

Furthermore, as shown in FIG. 2, this cellular phone 10 further comprises (i) a vibrator 24 for vibrating the cellular phone 10 when a call arrives and thus notifying the user of such call arrival, and (j) an acceleration and attitude sensor 28 for detecting the acceleration which is acting upon this cellular phone 10 and the attitude of the cellular phone 10. This vibrator 24 and acceleration and attitude sensor 28 are disposed internally to the cellular phone 10.

Furthermore, the cellular phone 10 comprises: (k) a host unit 30 for fulfilling its basic functions as a cellular phone, such as the communication function and so on; (1) an engine unit 40 which executes an engine application; and (m) a display image generation unit 60 which creates display image data MID to be supplied to the main display unit 25M, based upon host image data HID from the host unit 30 and engine application image data EID from the engine unit 40. This host unit 30, engine unit 40, and display image generation unit 60 are disposed internally to the cellular phone 10.

The host unit 30 comprises a host processor 31 which controls the cellular phone 10 as a whole, a wireless communication unit 32 for transceiving communication signals via an antenna 33, and a storage unit 35 which stores programs and data. Here, the wireless communication unit 32 and the storage unit 35 are connected to the host processor 31. Furthermore, the above described input unit 21, microphone 22, speaker for guidance 26S, LED 27, sub-display unit 25S, and vibrator 24 are also connected to the host processor 31.

The host processor 31 is implemented with a central processing device (CPU) function and a digital signal processor (DSP) function. By reading out and executing a program for the host 38 (refer to FIG. 3) which is stored in the storage unit 35, the host processor 31 performs the basic functionality operations such as the communication function operation and the like, and exchange of various kinds of data with the engine unit 40.

The storage unit 35 comprises a volatile region 36 for temporarily storing various types of data, and a non-volatile region 37 for storing programs and the like permanently. The volatile region 36 is constituted by a volatile storage element whose stored contents are not guaranteed to be preserved when the supply of operating electrical power ceases. Furthermore, the non-volatile region 37 is constituted by a non-volatile storage element whose stored contents are guaranteed to be preserved when the supply of operating electrical power ceases. Here, as shown in FIG. 3, in the non-volatile region 37, in addition to the program for the host 38 described above, there are also stored an overall engine control program $39_0$ and engine applications $39_1, 39_2, \ldots$, which are executed by the engine unit 40.

Here, in a control information section for each of the engine applications $39_1, 39_2, \ldots$, a specification is made as to whether the vertical direction of the main display unit 25M in the above described FIG. 1A (the Y axis direction) is used as the vertical direction of the display, or is used as its horizontal direction. Furthermore, in this control information section for each of the engine applications $39_1, 39_2, \ldots$, a specification is made of the position of the region used upon the main display unit 25M, and of its size.

Returning to FIG. 2, the engine unit 40 comprises an engine processor 41 which controls the engine unit 40 as a whole, and a storage unit 42 which stores programs and data executed by this engine processor 41. Here, this storage unit 42 is connected to the engine processor 41. Furthermore, the above described main display unit 25M and speaker 26M are connected to the engine processor 41.

Figure 4:
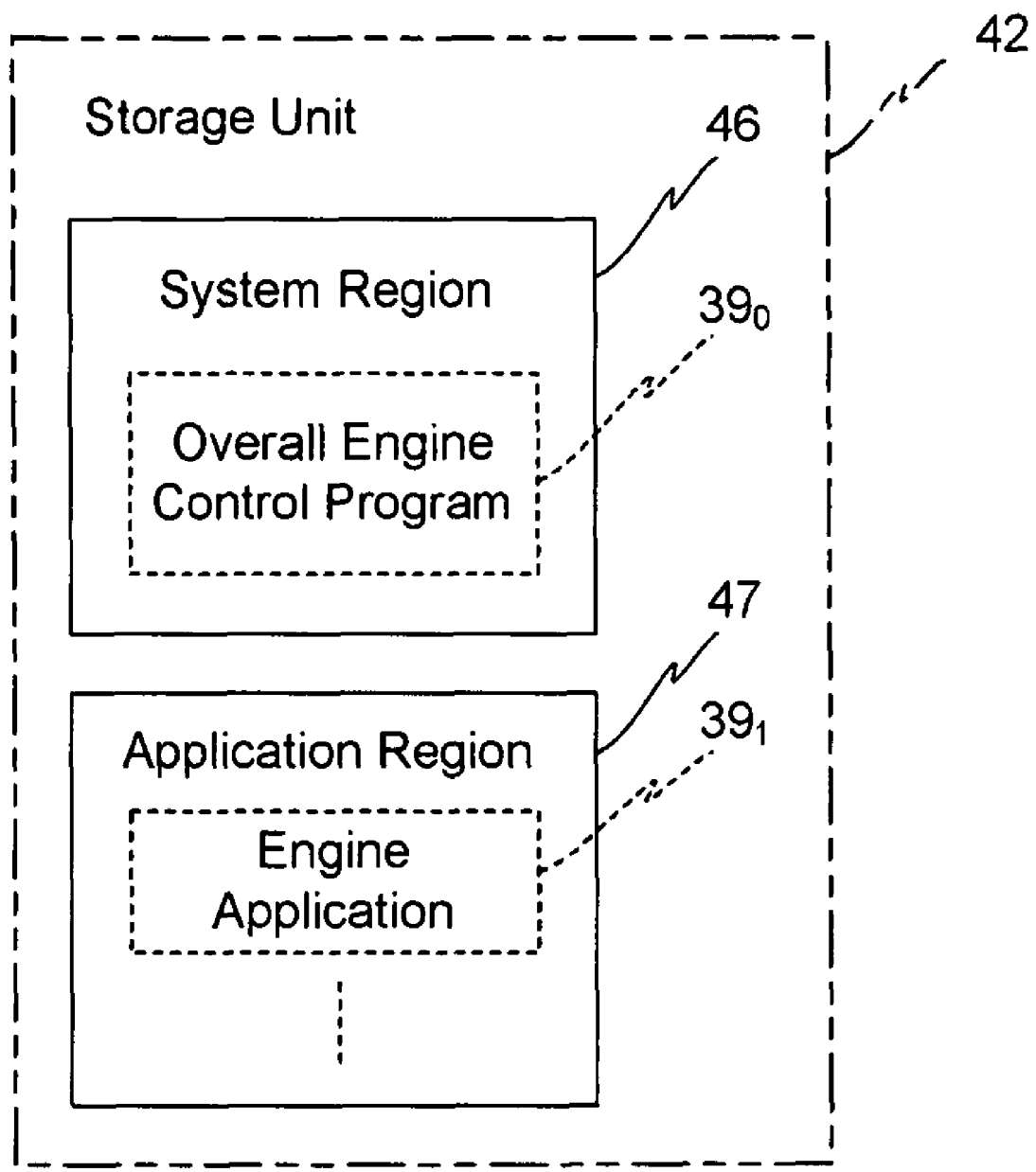
FIG. 4 is a figure for explanation of the structure of a storage unit of an engine unit of FIG. 2.

The storage unit 42 is made as a volatile storage element whose stored contents are not guaranteed to be preserved when the supply of operating electrical power ceases. Here, as shown in FIG. 4, in the storage unit 42, there are provided a system region 46 in which the above described overall engine control program $39_0$ is stored, and an engine application region 47 in which one or more of the engine applications $39_1, 39_2, \ldots$ is stored.

Figure 5:
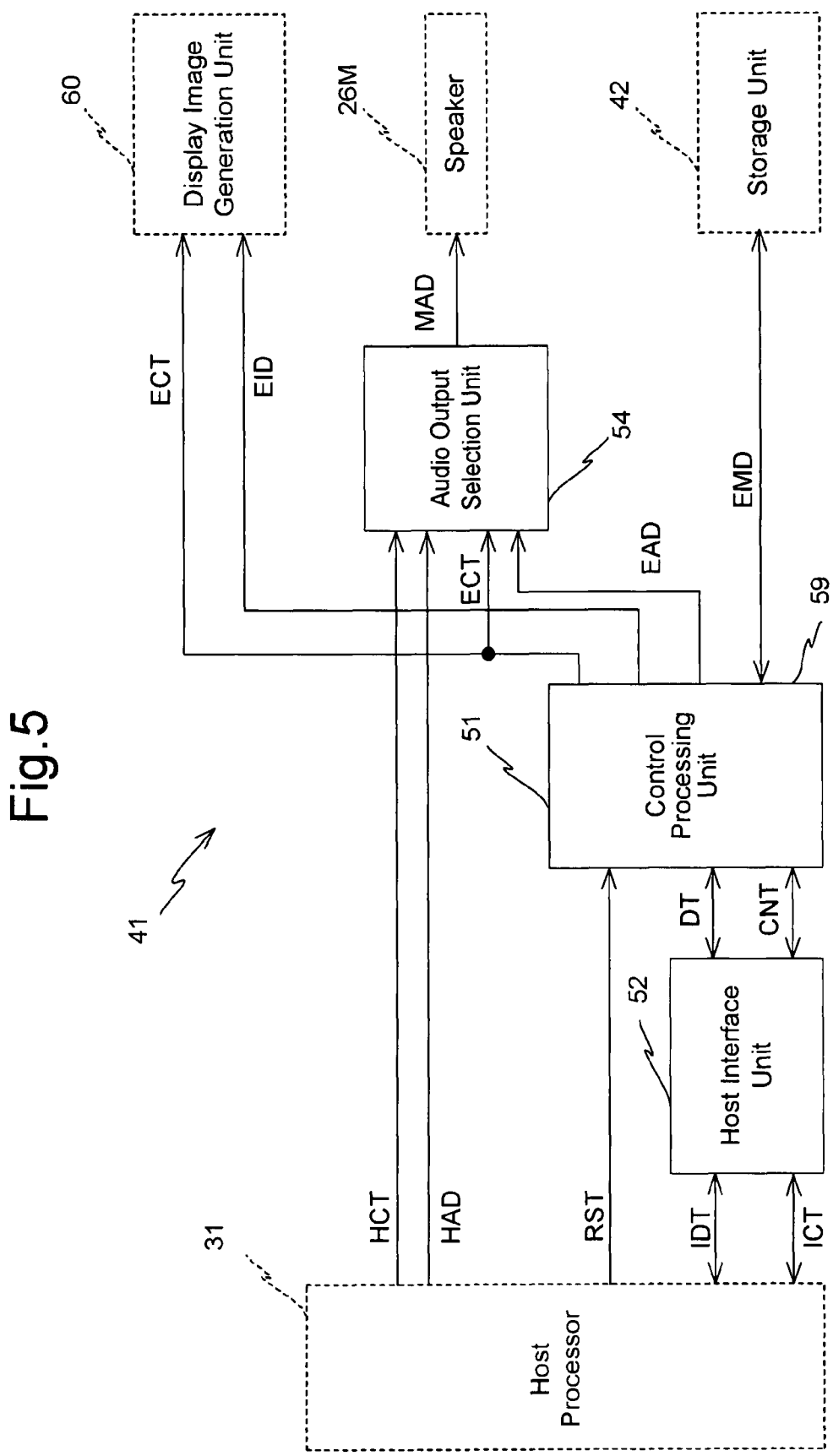
FIG. 5 is a block diagram for explanation of the structure of an engine processor of FIG. 2.

As shown in FIG. 5, the engine processor 41 comprises a control processing unit 51 and a host interface unit 52. Furthermore, the engine processor 41 comprises an audio output selection unit 54 for selecting, as an audio signal MAD which is to be supplied to the speaker 26M, either a host audio signal HAD from the host unit 30 or an engine audio signal EAD from the control processing unit 51, and for supplying this selected signal to the speaker 26M.

The control processing unit 51 executes any one of the engine applications $39_1, 39_2, \ldots$, based upon control by the overall engine control program $39_0$. It should be understood that this control processing unit 51 is implemented with a three dimensional graphic processing function and an audio generation processing function, and, when executing any of the above described engine applications $39_1, 39_2, \ldots$, it may exert this three dimensional graphic processing function and/or this audio generation processing function.

The host interface unit 52 is positioned between the host unit 30 and the control processing unit 51, and performs buffering of various types of command and various types of data which are transferred to and from the host unit 30, and intermediation of various types of control signal. This host interface unit 52 comprises a two-port RAM (Random Access Memory) element.

In the host interface unit 52, at one port of its two-port RAM element, it is connected to the control processor 51 by an internal data signal DT and an internal control signal CNT. Here, in the internal control signal CNT, there are included internal read out command signals from the two-port RAM and internal write command signals to the two-port RAM and the like, which are issued by the control processing unit 51 to the host interface unit 52. Furthermore, in this internal control signal CNT, there are included internal interrupt signals and so on, which are issued by the host interface unit 52 to the control processing unit 51, and which indicate that data has been sent from the host unit 30 to the engine unit 40.

Furthermore, in the host interface unit 52, at the other port of its two-port RAM element, it is connected to the host unit 30 by, for example, an 8-bit parallel interface data signal IDT and an interface control signal ICT. Here, in this interface control signal ICT, there are included interface read out command signals from the two-port RAM and interface write command signals to the two-port RAM and the like, which are issued by the host unit 30 to the host interface unit 52. Furthermore, in this interface control signal ICT, there are included interface interrupt signals and so on, which are issued by the host interface unit 52 to the host unit 30, and which indicate that data has been sent from the engine unit 40 to the host unit 30.

By exchanging this type of signal, it is arranged for transfer of commands and responses between the host unit 30 and the engine unit 40 to be performed via the host interface unit 52, accompanied with appended data, according to requirements.

In the audio output selection unit 54, corresponding to designation by a host output control signal HCT from the host unit 30 and by an engine output control signal ECT from the control processing unit 51, as described below, one of the host audio signal HAD and the engine application audio signal EAD is selected and outputted as the audio signal MAD. In other words, if priority output of host audio is being designated by the host output control signal HCT, then, irrespective of any designation by the engine output control signal ECT, the audio output selection unit 54 selects the host audio signal HAD, and outputs it as the audio signal MAD.

Furthermore, when priority output of the host audio is not being designated by the host output control signal HCT, and moreover engine application audio output is being designated by the engine output control signal ECT, then the audio output selection unit 54 selects the engine audio signal EAD, and outputs it as the audio signal MAD. Furthermore, when priority output of the host audio is not being designated by the host output control signal HCT, and moreover engine application audio output is not being designated by the engine output control signal ECT either, then the audio output selection unit 54 selects the host audio signal HAD, and outputs it as the audio signal MAD.

Returning to FIG. 2, according to commands by the host output control signal HCT from the host unit 30 and by the engine output control signal ECT from the control processing unit 51, as described below, the display image generation unit 60 generates a display image for display upon the main display unit 25M from a host image according to the host display image signal HID and from an engine application image according to the engine display image signal EID, outputs this display image to the main display unit 25M via the display image signal MID. In other words, if priority output of the host image is being designated by the host output control signal HCT, then, irrespective of any designation by the engine output control signal ECT, the display image generation unit 60 generates a display image by giving priority to the host image in a common region for the host image region and the engine application image region upon the display screen of the main display unit 25M, which has been designated in advance from the host unit 30. The display image generation unit 60 then outputs this display image which it has created to the main display unit 25M via the display image signal MID.

Moreover, if priority output of the host image has not been designated by the host output control signal HCT, and furthermore engine application image output is being designated by the engine output control signal ECT, then the display image generation unit 60 generates a display image by giving priority to the engine application image in the above described common region, and outputs it to the main display unit 25M via the display image signal MID. Furthermore, if priority output of the host image is not being designated by the host output control signal HCT, and moreover engine application image output is not being designated by the engine output control signal ECT either, then the display image generation unit 60 generates a display image from the host image only. The display image generation unit 60 then outputs this display image which it has created to the main display unit 25M via the display image signal MID.

Furthermore, when the contents of the engine application image cannot be fitted within the region for the engine application image which has been designated from the host, then the display image generation unit 60 shrinks the engine application image both in the vertical direction and in the horizontal direction by the same magnification, so that it does fit within this region for the engine application image. Subsequently, the display image generation unit 60 generates a display image as described above, and outputs it to the main display unit 25M via the display image signal MID.

It should be understood that, when no engine application is being executed by the engine unit 40 (including the case when such an engine application is being paused), then the host unit 30 designates priority output of the host image by the host output control signal HCT. On the other hand, if any engine application is being executed by the engine unit 40, then the host unit 30 does not perform designation of priority output of the host image by the host output control signal HCT.

Furthermore, output of the engine application image by the engine output control signal ECT is designated by the engine unit 40 when any engine application is being executed, or is being paused. On the other hand, when all engine applications are stopped, the engine unit 40 does not perform designation of engine application image output by the engine output control signal ECT.

Next, the coordinated operation of the host unit 30 and the engine unit 40 in this cellular phone 10 having the structure described above will be explained, with attention being principally directed to the display upon the main display unit 25M.

As a premise, it is supposed that the overall engine control program $39_0$ and an engine application $39_1$ are already loaded into the storage unit 42 of the engine unit 40. The loading of this overall engine control program $39_0$ and this engine application $39_1$ is performed in the following manner.

First, the host unit 30 reads out the overall control program $39_0$ from the non-volatile region 37 of the storage unit 35. Subsequently, the host unit 30 reflects in the interface data signal IDT a load command for the overall engine control program, in which the overall engine control program $39_0$ is taken as appended data, and sends it to the engine unit 40. This overall engine control program $39_0$ is stored in the system region 46 of the storage unit 42 via the two-port RAM of the host interface unit 52.

When the storage of the overall engine control program $39_0$ in the storage unit 42 in this manner is completed, the host unit 30 takes an execution start command for this overall engine control program as transmitted data, reflects it in the interface data signal IDT and sends it to the engine unit 40. As a result, the control processing unit 51 starts the execution of the overall engine control program $39_0$.

Next, the host unit 30 reads out the engine application $39_1$ from the non-volatile region 37. Subsequently, the host unit 30 reflects in the interface data signal IDT a load command for the engine application $39_1$, in which the engine application $39_1$ is taken as appended data, and sends it to the engine unit 40. This engine application $39_1$ is stored in the application region 47 of the storage unit 42 via the two-port RAM of the host interface unit 52.

By doing the above, when the loading of the overall engine control program $39_0$ and of the engine application $39_1$ into the storage unit 42 has been completed, thereafter, the engine unit 40 is in the state in which it is capable of starting the execution of the engine application $39_1$, in response to the execution start command for the engine application $39_1$ from the host unit 30. It should be understood that, after the execution of the engine application $39_1$ has been started, the engine unit 40 sometimes may stop the execution of the engine application $39_1$ in response to an execution stop command for the engine application $39_1$ from the host unit 30, or sometimes may pause the execution of the engine application $39_1$ in response to a pause command for the engine application $39_1$ from the host unit 30. Furthermore, after the engine application $39_1$ has been loaded, the engine unit may unload the engine application $39_1$ from the storage unit 42 in response to an unload command for the engine application $39_1$ from the host unit 30.

Furthermore, as a premise, it will be supposed that the vertical direction of the display when the engine application $39_1$ is using the main display unit 25M is the vertical direction (the Y axis direction) of the main display unit 25M in FIG. 1A described above. Moreover it will be supposed that the host image region HIA which the host unit 30 uses for displaying the host image upon the display screen of the main display unit 25M, while the engine application $39_1$ is being executed or while it is being paused, has the position and the size shown in FIG. 6A. Alternatively, it will also be supposed that the engine application image region $EIA1_1$, which the engine application $39_1$ uses for displaying the engine application image upon the display screen of the main display unit 25 during execution of the engine application $39_1$, has the position and the size shown in FIG. 6A.

Figure 6A:
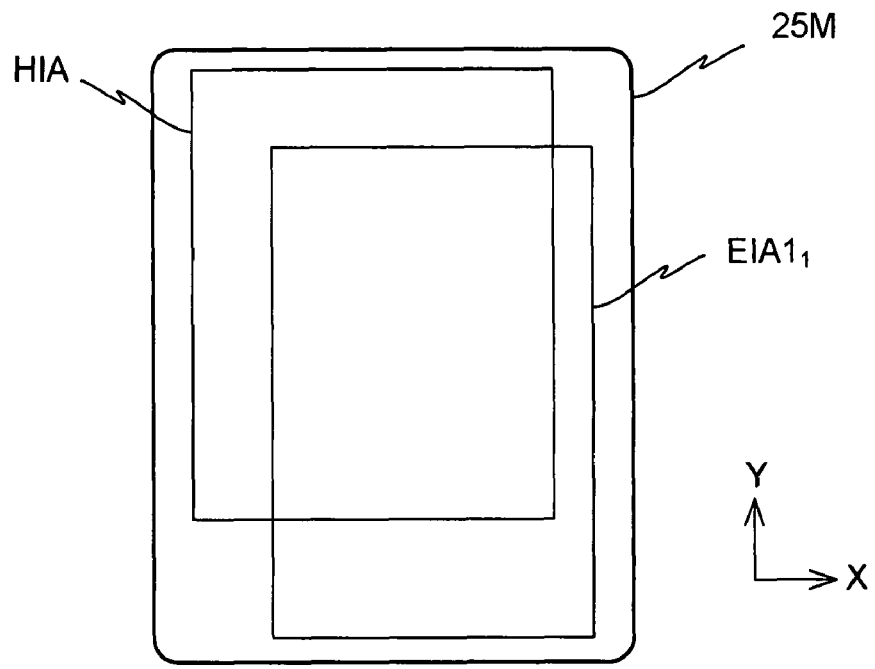
FIG. 6A is a figure for explanation of a host image region and an engine application image region during execution of an engine application upon the cellular phone of FIGS. 1A through 1C.
Figure 6B:
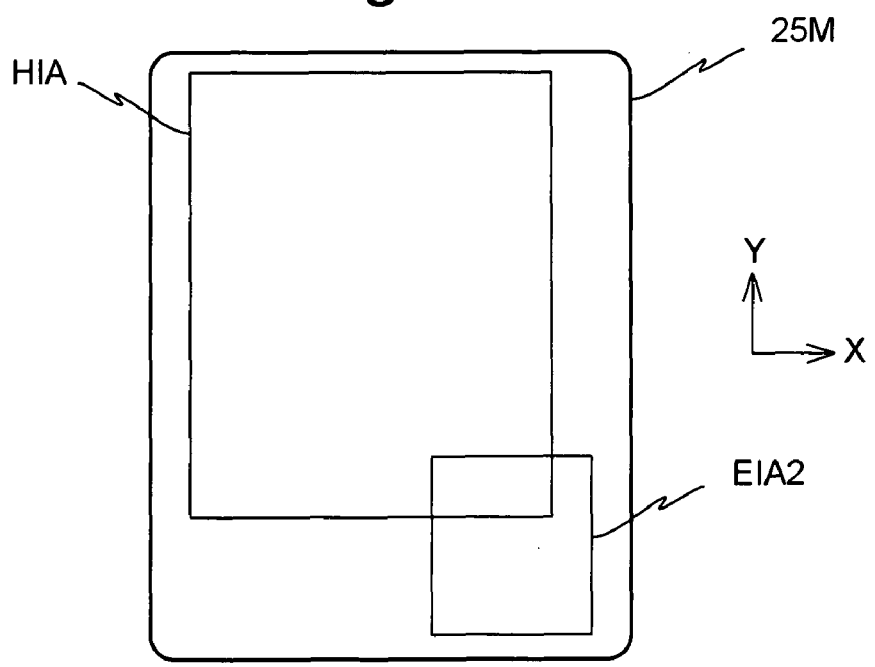
FIG. 6B is a figure for explanation of a host image region and an engine application image region during pausing of this engine application upon the cellular phone of FIGS. 1A through 1C.

Even further, as a premise, it will be supposed that the engine application image region EIA2, when the engine application $39_1$ is paused, has the position and the size shown in FIG. 6B. The position and the size of this engine application image region EIA2 are determined in advance in association with the host image region HIA.

-The Display while the Engine Application is Stopped-

When the engine application $39_1$ is in the state of being stopped by the engine unit 40, as described above, along with the host unit 30 (in more detail, the program for the host 38 which is being executed by the host processor 31) designating priority output of the host image with the host output control signal HCT, the engine unit 40 does not perform designation of engine application image output with the engine output control signal ECT. Due to this, the display image generation unit 60 only creates a display image from the host image according to the host display image signal HID, created due to execution of the program for the host 38 by the host processor 31 of the host unit 30.

Moreover, when the engine application $39_1$ is in the state of being stopped by the engine unit 40, the host unit 30 displays the host image by taking the entire screen of the main display unit 25M as the display region, while taking the vertical direction in FIG. 1A described above, which is the normal display direction, as the vertical direction for this display. As a result, the host image is displayed upon the display screen of the main display unit 25M in the entire area of the display screen of this main display unit 25M, as shown in FIG. 7A. After that, until the execution of the engine application $39_1$ is started, display is performed in the mode shown in FIG. 7A.

-The Display while the Engine Application is being Executed-

When, in the state in which the engine application $39_1$ is stopped, an execution command for the engine application $39_1$ is received from the user via the input unit 21, then, in the host unit 30, from the non-volatile region 37 of the storage unit 35, the host processor 31 reads out from the control information section of the engine application $39_1$ the display direction when using the main display unit 25M, and the position and size of the engine application region $EIA1_1$ when using the main display unit 25M. Subsequently, the host processor 31, along with notifying the position and the size of the host image region HIA and the position and the size of the engine application image region $EIA1_1$ to the display image generation unit 60, also stops the designation of priority output of the host image by the host output control signal HCT. The host unit 30, along with creating a host image which matches this host image region HIA and sending it to the display image generation unit 60, also sends to the engine unit 40 an execution start command for the engine application $39_1$ to accompany the designation of this engine application $39_1$.

Upon receipt of this execution start command for the engine application $39_1$, along with the overall engine control program $39_0$ which is being executed by the engine processor 41 starting the execution of the engine application $39_1$, the engine unit 40 also performs designation of engine application image output with the engine output control signal ECT. Furthermore, this engine application $39_1$ whose execution has been started generates an engine application image. The engine application image which has been generated in this manner is sent by the engine unit 40 to the display image generation unit 60, using the engine display image signal EID.

Since the designation of engine application image output is being performed with the engine output control signal ECT, the display image generation unit 60 generates a display image based upon the host image according to the host display image signal HID from the host unit 30, and upon the engine application image EID from the engine unit 40. During the creation of this display image, since the designation of priority output of the host image is not being performed with the host output control signal HCT, accordingly the display image generation unit 60 generates a display image in which the engine application image within the engine application image region $EIA1_1$ is superimposed over the host image within the host image region HIA.

As a result, an image as shown in FIG. 7B is displayed upon the display screen of the main display unit 25M. After that, display is performed in the mode shown in FIG. 7B until the execution of the engine application $39_1$ is stopped or is paused.

-The Display while the Engine Application is Paused-

When, in the state in which the engine application $39_1$ is being executed, a pause command for the engine application $39_1$ has been received from the user via the input unit 21, or when the occurrence has been detected of a specified event such as the arrival of an incoming voice call or the like whose priority for processing is higher than that of execution of the engine application $39_1$, then the host unit 30, along with performing designation of priority output for the host image with the host output control signal HCT, also notifies the position and the size of the engine application image region EIA2 to the display image generation unit 60. Furthermore, the host unit 30 also sends to the engine unit 40 a pause command for the engine application $39_1$, to accompany the designation of the engine application $39_1$.

Upon receipt of this pause command for the engine application $39_1$, the overall engine control program $39_0$ of the engine unit 40 pauses the execution of the engine application $39_1$. It should be understood that the designation of engine application image output from the engine unit 40 with the engine output control signal ECT is maintained. Furthermore, when the execution of the engine application $39_1$ is paused, the engine unit 40 continues the output of the engine application image at the time point at which this pausing has been performed.

Since the designation of engine application image output with the engine output control signal ECT is continued, the display image generation unit 60 generates a display image based upon the host display image signal HID from the host unit 30, and upon the engine application image EID from the engine unit 40. During the generation of this display image, since the designation of priority output of the host image with the host output control signal HCT is being performed, accordingly the display image generation unit 60 creates a display image in which the engine application image within the engine application image region EIA2 is superimposed over the host image of the host image region HIA. It should be understood that the display image generation unit 60 shrinks down the engine application image to a size at which it fits within the engine application image region EIA2.

As a result, an image as shown in FIG. 7C is displayed upon the display screen of the main display unit 25M. After that, display is performed in the mode shown in FIG. 7C until the execution of the engine application $39_1$ is resumed or is stopped.

As has been explained above, in this embodiment, when the engine application $39_1$ is being executed by the engine unit 40, the host unit 30 determines the host image region HIA, which is the region for host display upon the display screen in which the host unit determines the contents of the display, according to the direction which is used for the display screen employed during the execution of said engine application $39_1$ by the engine unit 40. Subsequently, the host unit 30 generates the host image, which is the image data to be displayed in the host image region HIA. Furthermore, when the engine application $39_1$ starts its operation, according to the progress of the execution of the engine application $39_1$, the engine unit 40 creates an engine application image which is to be displayed in the engine application image region $EIA1_1$, which is the region upon the display screen for engine display while the engine application $39_1$ is executing, determined corresponding to the engine application.

When generating the host image and the engine application image during the execution of the engine application $39_1$ in this manner, the display image generation unit 60 generates an image during engine application execution in which the host image and the engine application image are superimposed, so that priority is given to the engine application image in the region where the host image region HIA and the engine application image region $EIA1_1$ are superimposed. This image during engine application execution is then displayed upon the display screen of the main display unit 25M.

Thus, according to the cellular phone 10 of this embodiment, along with it being possible to build the entire device in a compact manner, also it is possible to ensure the convenience from the point of view of the user.

Furthermore, during pausing of the engine application $39_1$, the display image generation unit 60 generates an image during engine application pausing in which the host image and the engine application image at the time point that said engine application $39_1$ was paused are superimposed, so that priority is given to the host image in the region where the host image region HIA and the engine application image region EIA2, which is the region for engine display during pausing of the engine application $39_1$, are superimposed. This image during engine application pausing is then displayed upon the display screen. As a result, while only using a single display screen, along with displaying the host image preferentially during pausing of the engine application; also the engine application image is displayed in the area in which it will not disturb the host image.

Furthermore, when the engine application $39_1$ has been paused, the host unit 30 sets the engine application image region EIA2, whose portion overlapping with the host image region HIA is small. Moreover, the display image generation unit 60 shrinks down the engine application image, so that it fits into this engine application image region EIA2. Due to this, while the engine application is paused, a perfect display of the host image is ensured, and moreover it is possible to display the greater portion of the engine application image which has been shrunk down in parallel with the host image. By doing this, it is possible to maintain the ambience which the user has built up by the execution of the engine application $39_1$, even in the state in which the engine application $39_1$ is paused.

It should be understood that, in the embodiment described above, the engine application which is loaded into the storage unit 42 of the engine unit 40 is taken as being the engine application $39_1$. By contrast, it would also be acceptable for this engine application which is loaded into the storage unit 42 of the engine unit 40 to be some other application than the engine application $39_1$. In this type of case, although the engine application image region $EIA1_j$ (where j=1, 2, . . . ) changes for each engine application $39_j$, it is arranged for the host image region HIA and the engine application image region EIA2 to be determined in advance by the host unit 30, and not to change according to the type of the engine application.

Furthermore, in the embodiment described above, the number of engine applications which are loaded into the storage unit 42 of the engine unit 40 was made to be one. By contrast, it would also be acceptable for the number of engine applications which are loaded into the storage unit 42 of the engine unit 40 to be a plurality thereof.

Figure 8A:
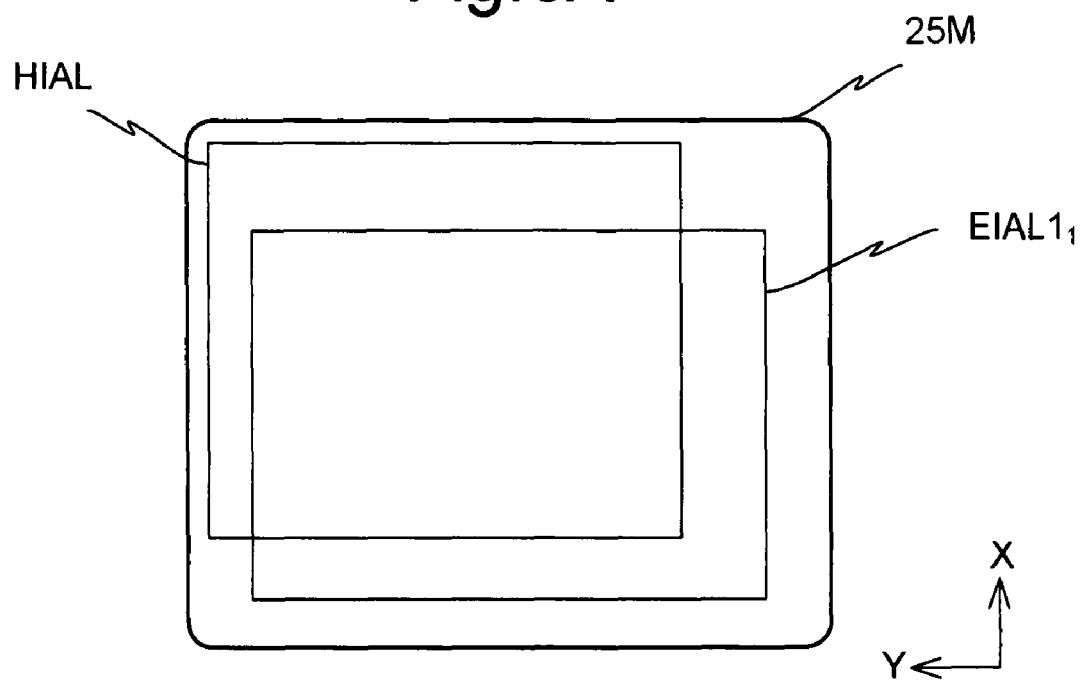
FIG. 8A is a figure for explanation of a host image region and an engine application image region during execution of an engine application, with a first variant embodiment.
Figure 8B:
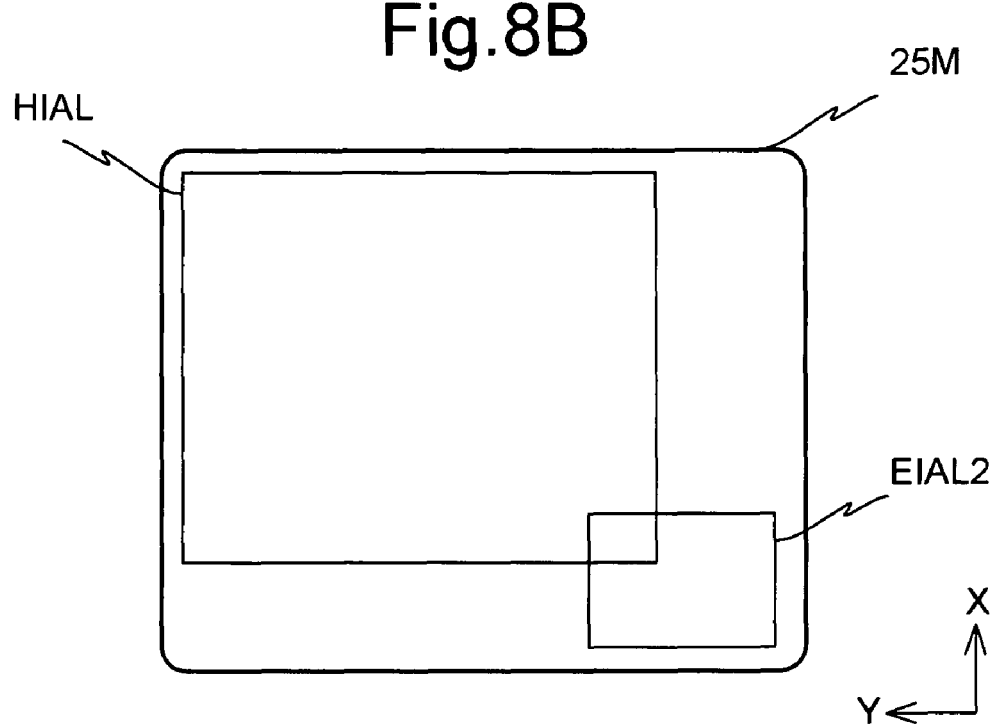
FIG. 8B is a figure for explanation of the host image region and the engine application image region during pausing of this engine application, with the first variant embodiment.

Moreover, in the embodiment described above, the vertical direction of the display when the engine application $39_1$ is using the main display unit 25M was taken as being the vertical direction (the Y axis direction) in FIG. 1A. By contrast, it would be possible for the vertical direction of the display when the engine application $39_1$ is using the main display unit 25M to be taken as being the horizontal direction (the X axis direction) in FIG. 1A. In this case, for example, a host image region HIAL and engine application image regions $EIAL1_1$ and EIAL2 might be set as shown in FIGS. 8A and 8B.

Figure 9:
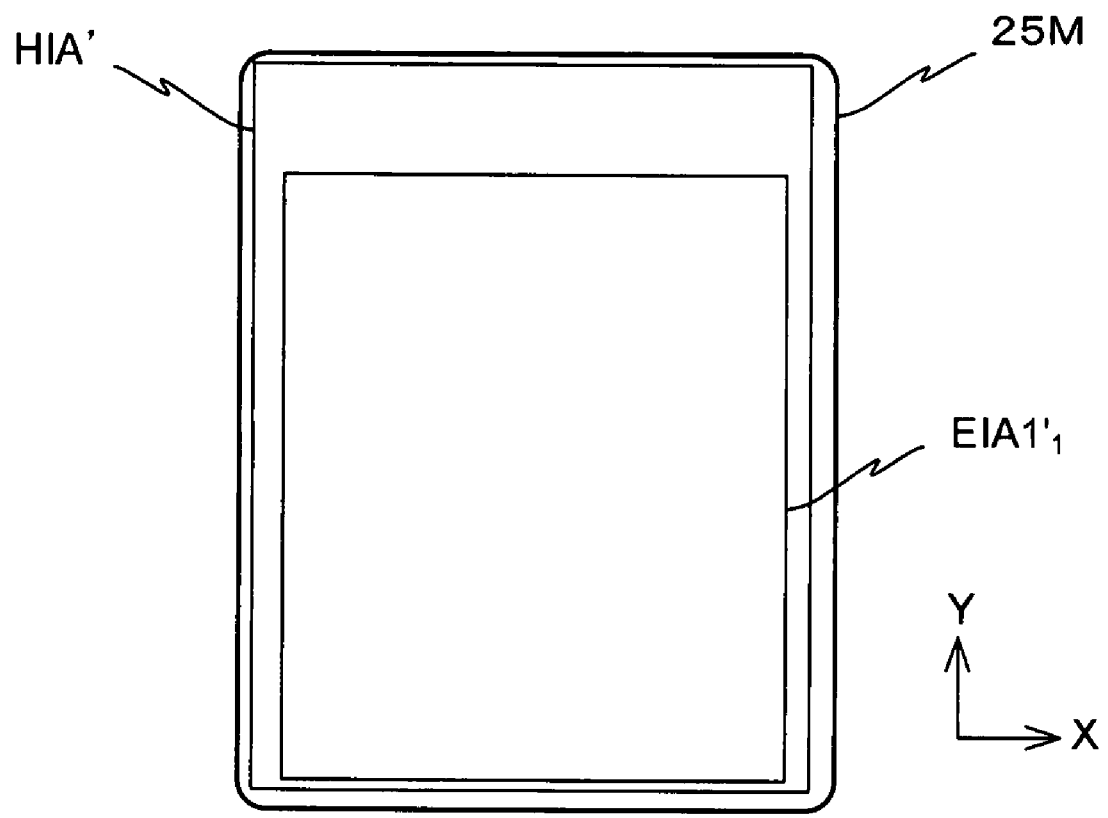
FIG. 9 is a figure for explanation of a host image region and an engine application image region during execution of an engine application, with a second variant embodiment.

Yet further, in the embodiment described above, during pausing of the engine application $39_1$, the host image region HIA was set to a partial region upon the display screen of the main display unit 25M, in order to make the greater portion of the shrunk down image of the engine application image during pausing be visible. By contrast it would also be acceptable, as shown in FIG. 9, along with making the host image region HIA' when the engine application $39_1$ is not stopped to be the entire area of the display screen of the main display unit 25M, also to arrange only to set an engine application image region $EIA1'_1$ during execution of the engine application $39_1$, without setting any engine application image region during pausing of the engine application $39_1$.

Figure 10A:
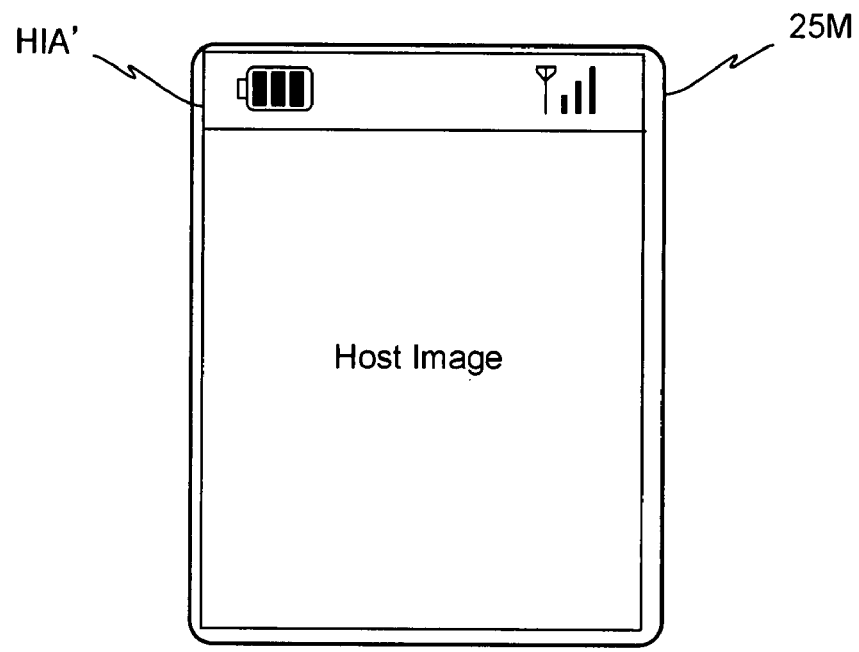
FIG. 10A is a figure showing an example of screen display at some time other than while this engine application is being executed, with the second variant embodiment.
Figure 10B:
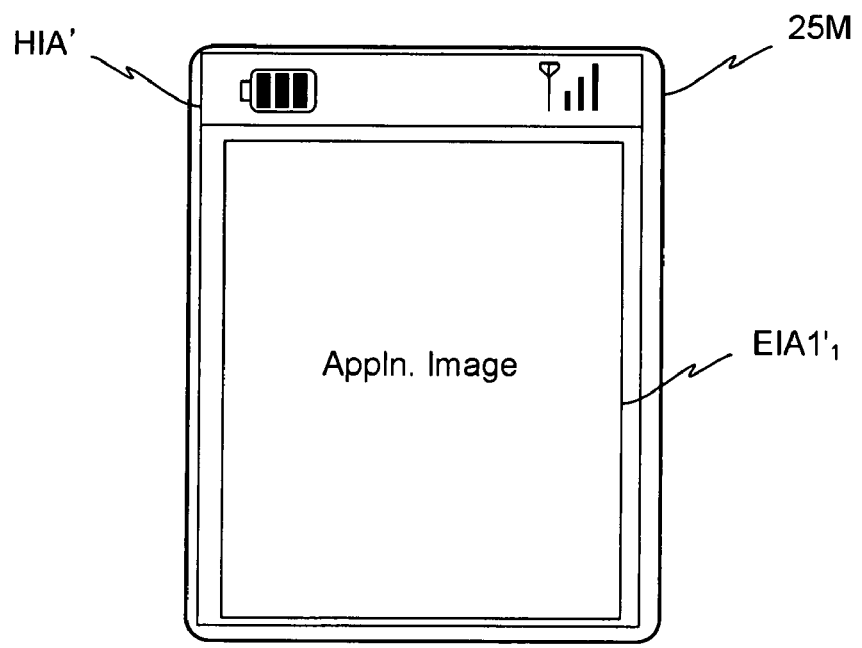
FIG. 10B is a figure showing an example of screen display while this engine application is being executed, with the second variant embodiment.

If this type of method is employed, then the host image is displayed in the entire area of the display screen of the main display unit 25M, apart from during execution of the engine application $39_1$, as shown in FIG. 10A. Furthermore, as shown in FIG. 10B, during execution of the engine application $39_1$, the engine application image is displayed upon the display screen of the main display unit 25M in a manner in which it is superimposed upon the host image. Since, in this case, it is possible to omit the setting by the host unit 30 of the engine application image region during pausing of the engine application $39_1$, and not to perform the shrinkage by the display image generation unit 60 of the engine application image during pausing of the engine application $39_1$, accordingly it is possible to make the structure of the device simple.

Figure 11A:
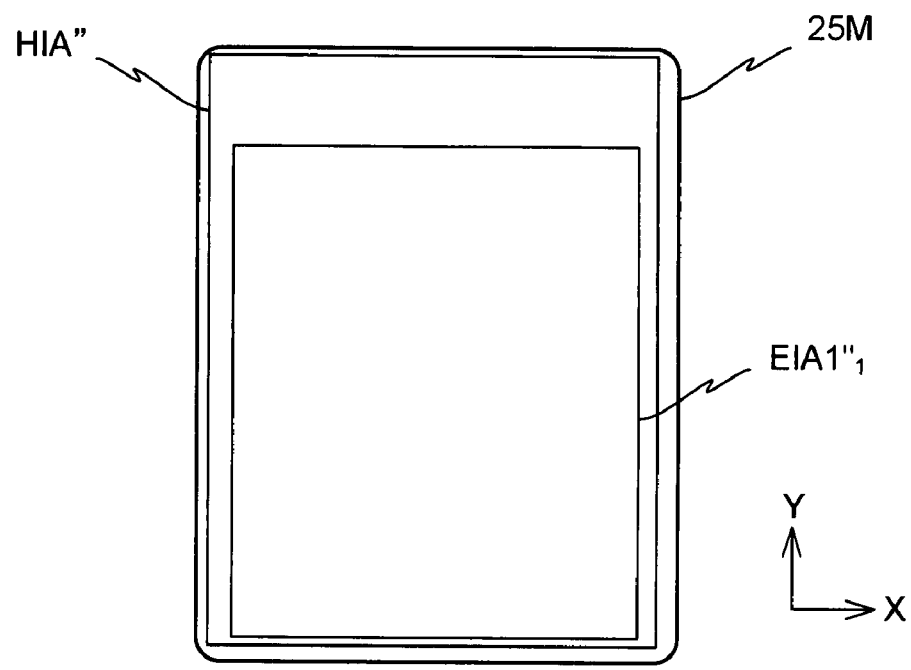
FIG. 11A is a figure for explanation of a host image region and an engine application image region during execution of an engine application, with a third variant embodiment.
Figure 11B:
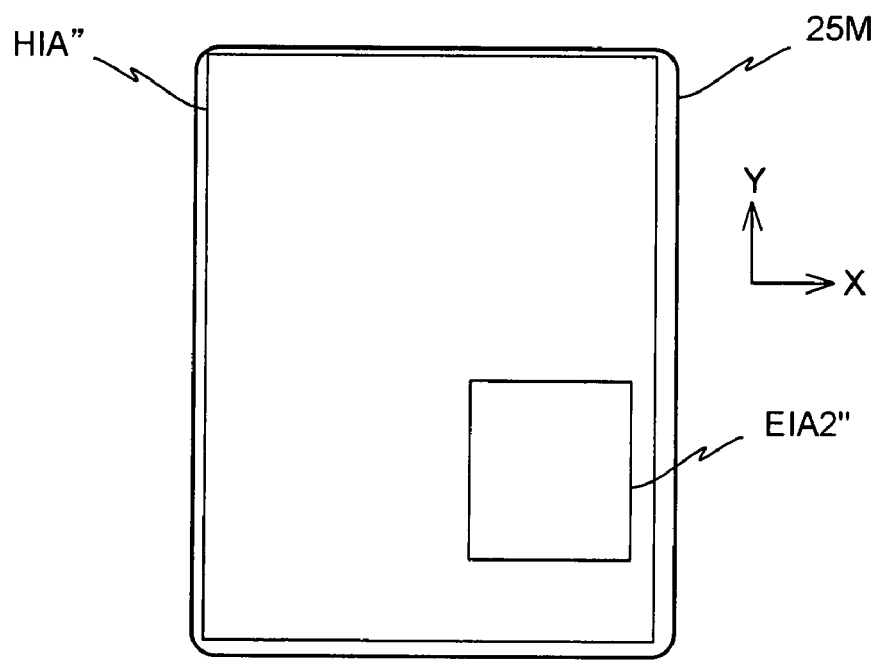
FIG. 11B is a figure for explanation of the host image region and the engine application image region during pausing of this engine application, with the third variant embodiment.
Figure 12A:
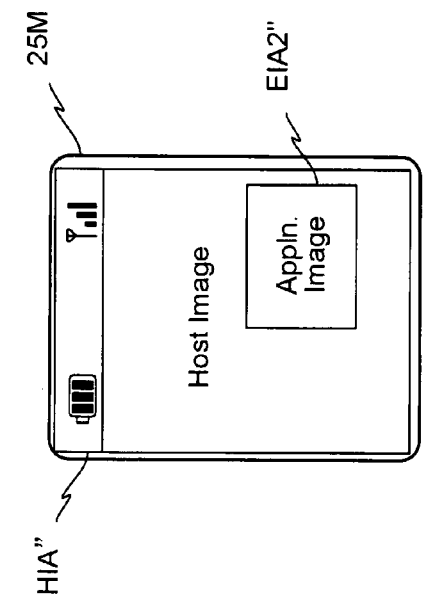
FIG. 12A is a figure showing an example of screen display while this engine application is stopped, with the third variant embodiment.
Figure 12B:
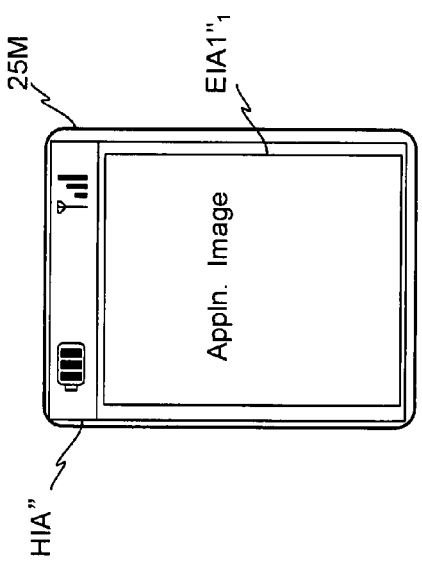
FIG. 12B is a figure showing an example of screen display while this engine application is being executed, with the third variant embodiment.
Figure 12C:
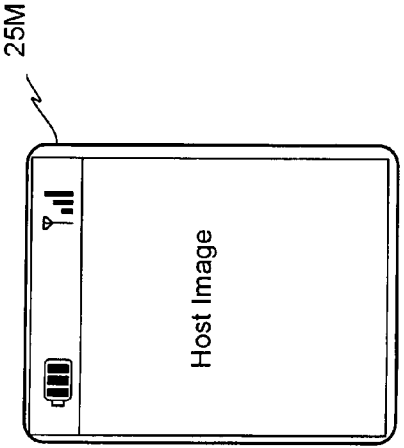
FIG. 12C is a figure showing an example of screen display while this engine application is paused, with the third variant embodiment.

Even further it was arranged, in the embodiment described above, along with designating the presence or absence of priority outputting of the host image with the host output control signal HCT, also to designate the presence or absence of outputting of the engine application image with the engine output control signal ECT. By contrast, it would also be acceptable to arrange, along with designating the presence or absence of outputting of the host image with the host output control signal HCT, to designate the presence or absence of priority outputting of the engine application image with the engine output control signal ECT. In this case, as shown by way of example in FIGS. 11A and 11B, by setting a host image region HIA" when the engine application $39_1$ is not stopped, an engine application image region $EIA1"_1$ during execution of the engine application $39_1$, and an engine application image region EIA2" during pausing of the engine application $39_1$, images as shown in FIG. 12A, FIG. 12B, and FIG. 12C are displayed upon the display screen of the main display unit 25M while the engine application $39_1$ is stopped, while it is executing, and while it is paused, respectively. Accordingly, it is possible to display the engine application image in shrunk down form in parallel with the host image, while ensuring that the major portion of the host image is displayed. By doing this, in the same manner as in the embodiment described above, it is possible to maintain the ambience which the user has built up by the execution of the engine application $39_1$, even in the state in which the engine application $39_1$ is paused.

Furthermore, the host processor 31 may be a single processor, or may have a two processor structure including a processor for communication and a processor for overall application operation; and it would also be possible to make control of the engine unit 40 in the embodiment described above be performed upon the processor for overall application operation.

Still further although, in the embodiment described above, it was arranged for the audio output selection unit 54 to be housed internally to the engine processor 41, it would also be possible to employ an arrangement in which it is external to the engine processor 41. Furthermore although, in the embodiment described above, it was arranged for the display image generation unit 60 to be disposed externally to the engine processor 41, it would also be possible to arrange for it to be housed internally to the engine processor 41.

Moreover although, in the embodiment described above, it was arranged for the host interface unit 52 to include a two-port RAM, it would also be possible to employ any desired structure, provided that it is one which is capable of interfacing with the host unit 30.

Furthermore although, in the embodiment described above, the cellular phone was made of a clamshell type, it would also be possible to apply the present invention to a cellular phone of a straight type, a revolver type, a slide type, or the like.

Still further although, in the embodiment described above, the present invention was applied to a cellular phone, of course it would also be possible to apply the present invention to some other type of communication terminal device.

As has been explained above, the coordinated operation method of the present invention may be applied to the coordinated operation of a host unit which comprises a host processor and which performs processing associated with communication with the exterior, and an engine unit which comprises an engine processor and which executes a predetermined function under the management of the host unit.

Furthermore, the present invention may be applied to a communication terminal device which comprises a host unit which performs processing associated with communication with the exterior, and an engine unit which executes a predetermined function under the management of the host unit.

What is claimed is:

1. A coordinated operation method in which a host unit which performs processing associated with communication with the exterior, and an engine unit which executes an engine application under the management of said host unit, operate in a coordinated manner in a communication terminal device, comprising:
   a region for host display definition step in which said host unit determines upon a region for host display upon a display screen during execution of said engine application by said engine unit, in which the display contents are determined by said host unit, according to the direction of usage of said display screen which is employed during execution of said engine application by said engine unit;
   a host image generation step in which said host unit generates a host image, which is image data to be displayed in said region for host display;
   an engine application image generation step in which, according to the progression of execution of said engine application, said engine unit generates an engine application image to be displayed in a region for engine display upon said display screen, which is determined corresponding to said engine application;
   an image during engine application execution generation step in which, during execution of said engine application, an image during engine application execution is generated in which said host image and said engine application image are overlapped so that, in the region in which said region for host display and said region for engine display are superimposed, priority is given to said engine application image;
   an image during engine application execution display step in which said image during engine application execution is displayed upon said display screen; and
   an engine display region shrinkage step in which said region for engine display is shrunk, said engine application image is reduced to a size at which all of said engine application image fits within said shrunk region for engine display, and said reduced engine application image is displayed in said region for engine display, when said engine application is paused.

2. A coordinated operation method according to claim 1, further comprising:
   an image during engine application pausing generation step in which, during pausing of said engine application, an image during engine application pausing is generated by overlapping said host image and said engine application image at the time point that said engine application has been paused, so that, in the region in which said region for host display and said region for engine display are superimposed, priority is given to said host image; and
   an image during engine application pausing display step in which said image during engine application pausing is displayed upon said display screen.

3. A coordinated operation method according to claim 1, further comprising:
   an image during engine application pausing generation step in which, during pausing of said engine application, along with setting the entire area of said display screen as said region for host display, also an image during engine application pausing is generated consisting only of said host image; and
   an image during engine application pausing display step in which said image during engine application pausing is displayed upon said display screen.

4. A coordinated operation method according to claim 1, further comprising:
   an image during engine application pausing generation step in which, during pausing of said engine application, an image during engine application pausing is generated by overlapping said host image and said engine application image at the time point that said engine application has been paused, so that, in the region in which said region for host display and said region for engine display are superimposed, priority is given to said engine application image; and
   an image during engine application pausing display step in which said image during engine application pausing is displayed upon said display screen.

5. A communication terminal device comprising:
   a host unit, comprising a host processor, which performs processing associated with communication with the exterior;
   an engine unit, comprising an engine processor, which executes an engine application under the management of said host unit;
   a display unit comprising a display screen which displays an image; and
   a display image generation unit which, under control by said host unit, generates a display image for display upon said display screen, based upon information for a host image from said host unit and information for an engine application image from said engine unit;
   and characterized in that:
   said host unit, during the execution of said engine application by said engine unit, along with determining a region for host display upon said display screen according to the direction of usage of said display screen which is employed during the execution of said engine application by said engine unit, also generates a host image, which is image data to be displayed in said region for host display;
   said engine unit, according to the progress of execution of said engine application, generates an engine application image to be displayed in a region for engine display upon said display screen, which said engine unit determines in correspondence to said engine application; and
   said display image generation unit, during the execution of said engine application, according to a command from said host unit, generates an image during engine application execution in which said host image and said engine application image are overlapped so that, in the region in which said region for host display and said region for engine display are superimposed, priority is given to said engine application image, characterized in that said display image generation unit shrinks down said region for engine display, said engine application image is reduced to a size at which all of said engine application image fits within said shrunk region for engine display, and said reduced engine application image is displayed in said region for engine display, when said engine application is paused, according to a command from said host unit.

6. A communication terminal according to claim 5, characterized in that said display image generation unit, during pausing of said engine application, according to a command from said host unit, generates an image during engine application pausing by overlapping said host image and said engine application image at the time point that said engine application has been paused, so that, in the region in which said region for host display and said region for engine display are superimposed, priority is given to said host image.

7. A communication terminal device according to claim 5, characterized in that said display image generation unit, during pausing of said engine application, according to a command from said host unit, along with setting the entire area of said display screen as said region for host display, also generates an image during engine application pausing consisting only of said host image.

8. A communication terminal device according to claim 5, characterized in that said display image generation unit, during pausing of said engine application, according to a command from said host unit, along with said shrinking down of said region for engine display, also generates an image during engine application pausing by overlapping said host image and said engine application image at the time point that said engine application has been paused, so that, in the region in which said region for host display and said region for engine display are superimposed, priority is given to said engine application image.

9. A communication terminal device according to claim 5, characterized in that said host unit further comprises a wireless communication unit, connected to said host processor, for performing wireless communication with a base station of a mobile communication network.

* * * * *